US008080327B1

(12) United States Patent
Rasmussen (10) Patent No.: US 8,080,327 B1
(45) Date of Patent: Dec. 20, 2011

(54) ELECTRICAL STORAGE DEVICE UTILIZING PYRAZINE-BASED CYANOAZACARBONS AND POLYMERS DERIVED THEREFROM

(75) Inventor: Paul George Rasmussen, Ann Arbor, MI (US)

(73) Assignee: Vinazene, Inc., Ann arbor, MI (US)

( * ) Notice: Subject to any disclaimer, the term of this patent is extended or adjusted under 35 U.S.C. 154(b) by 0 days.

(21) Appl. No.: 13/169,300

(22) Filed: Jun. 27, 2011

(51) Int. Cl.
*H01M 4/36* (2006.01)
(52) U.S. Cl. ......... 429/105; 429/108; 429/101; 429/201
(58) Field of Classification Search .................. 429/105, 429/108, 101, 51, 218.1, 328, 339, 201
See application file for complete search history.

(56) References Cited

U.S. PATENT DOCUMENTS

| 5,527,640 | A | 6/1996 | Rudge et al. | |
|---|---|---|---|---|
| 2002/0102464 | A1* | 8/2002 | Yoshida et al. | 429/300 |
| 2007/0031729 | A1* | 2/2007 | Sato et al. | 429/188 |
| 2007/0269710 | A1* | 11/2007 | Hirano et al. | 429/46 |

FOREIGN PATENT DOCUMENTS

| JP | 1998251259 A | | 9/1998 |
|---|---|---|---|
| JP | 2004189674 A | | 7/2004 |
| JP | 2008-117721 | * | 5/2008 |

OTHER PUBLICATIONS

D.M. De Leeuw, M.M.J. Simenon, A.R. Brown, R.E.F. Einerhand; "Stability of n-type doped conducting polymers and consequences for polymeric microelectronic devices"; Synthetic Metals 87 (1997) 53-59.

C. J. Tonzola, M. M. Alam, W. Kaminsky, and S. Jenekhe; "New n-Type Organic Semiconductors: Synthesis, Single Crystal Structures, Cyclic Voltammetry, Photophysics, Electron Transport, and Electroluminescence of a Series of Diphenylanthrazolines"; Journal of the American Chemical Society 2003, 125, 13548-13558.

M. Winkler, K. N. Houk; "Nitrogen-Rich Oligacenes: Candidates for n-Channel Organic Semiconductors"; Journal of the American Chemical Society, 2007, 129, 1805-1815.

P. Novak, K. Muller, K. S. V. Santhanum, O. Haas; "Electrochemically Active Polymers for Rechargeable Batteries"; Chemical Reviews 1997, 97, 207-281.

(Continued)

*Primary Examiner* — Raymond Alejandro
(74) *Attorney, Agent, or Firm* — Jelic Patent Services, LLC; Stanley E. Jelic (57) ABSTRACT

An electrical storage device utilizing a pyrazine-based cyanoazacarbon or pyrazine-based cyanoazacarbon polymer as a redox active material which can undergo both oxidation and reduction. The device has an ion selective barrier with a cathode side and an anode side; a cathode compartment which is functionally attached to the cathode side of the ion selective barrier and contains a mixture of pyrazine-based cyanoazacarbons, solvent, and positive ions of pyrazine-based cyanoazacarbons; an anode compartment which is functionally attached to the anode side of the ion selective barrier and contains a mixture of pyrazine-based cyanoazacarbons, solvent, and negative ions of pyrazine-based cyanoazacarbons; a cathode which is electrically connected to the cathode compartment; and an anode which is electrically connected to the anode compartment. In one embodiment, the electrical storage device has an electrolyte reservoir which uses an asymmetric membrane design to transfer electrical charge between an anode section and cathode section. For slow redox, the electrical storage device functions as a rechargeable battery. For rapid redox, the electrical storage device functions as a supercapacitor.

10 Claims, 9 Drawing Sheets

OTHER PUBLICATIONS

A. Rudge, I. Raistrick, S. Gottesfeld, J. P. Ferraris; "A Study of the Electrochemical Properties of Conducting Polymers for Applications in Electrochemical Capacitors"; Electrochimica Acta 39, #2, 273-287, 1994.

A. Rudge, J. Davey, I. Raistrick and S. Gottesfeld; "Conducting polymers as active materials in electrochemical capacitors"; Journal of Power Sources, 47, (1994) 89-107.

J.Y. Juang, K. Fukunishi, M. Matsuoka; "Synthesis and Spectral Properties of 2,3,7,8-Tetracyano-5,10-dihydrodipyrazino[2,3-b:2',3'-e]pyrazine"; Journal of Heterocyclic Chemistry, 34(2) 653 (1997).

J.-I. Nishida, Naraso, S. Murai, E. Fujiwara, H. Tada, M. Tomura, Y. Yamashita; "Preparation, Characterization, and FET Properties of Novel Dicyanopyrazinoquinoxaline Derivatives"; Organic Letters, 6(12), 2004, 2007-2010.

* cited by examiner

ELECTRICAL STORAGE DEVICE UTILIZING PYRAZINE-BASED CYANOAZACARBONS AND POLYMERS DERIVED THEREFROM

FIELD OF THE INVENTION

The present disclosure is in the technical field of electrical storage devices. More particularly, the present disclosure focuses on batteries, redox flow batteries, and supercapacitors utilizing pyrazine-based cyanoazacarbons.

BACKGROUND OF THE INVENTION

Electrical storage devices such as batteries and supercapacitors typically use metal or silicon based inorganic materials. In contrast, the present disclosure describes electrical storage devices which use organic materials such as pyrazine-based cyanoazacarbons.

BRIEF SUMMARY OF THE INVENTION

The present disclosure provides pyrazine-based cyanoazacarbons and polymers derived therefrom for use in electrical storage devices. Examples of electrical storage devices include rechargeable batteries, redox flow batteries, supercapacitors, and the like. The pyrazine-based cyanoazacarbon is a redox active material which can undergo both oxidation and reduction, such as dibutyltetracyanohexaazaanthracene. The pyrazine-based cyanoazacarbon is dissolved in a solvent. Examples of solvents are acetonitrile, mixtures of propylene carbonate and ethylene carbonate, and the like.

Described herein is an electrical storage device utilizing pyrazine-based cyanoazacarbons or polymers derived from pyrazine-based cyanoazacarbons, the device comprising: an ion permeable membrane having a cathode side and an anode side; a cathode compartment which is functionally attached to the cathode side of the ion permeable membrane and contains a mixture of pyrazine-based cyanoazacarbons, solvent, and negative ions of pyrazine-based cyanoazacarbons; an anode compartment which is functionally attached to the anode side of the ion permeable membrane and contains a mixture of pyrazine-based cyanoazacarbons, solvent, and positive ions of pyrazine-based cyanoazacarbons; a cathode which is electrically connected to the cathode compartment; and an anode which is electrically connected to the anode compartment. Both compartments typically contain inert supporting electrolyte such as tetraethylammonium tetrafluoroborate salt or the like.

In one embodiment, an asymmetric set of ion permeable membranes is used that comprises: an electrolyte reservoir containing an electrolyte liquid consisting of positive ions and negative ions; a cation exchange resin which is functionally attached to the electrolyte reservoir and transports the positive ions; and an anion exchange resin which is functionally attached to the electrolyte reservoir and transports the negative ions.

In one embodiment, the cation exchange resin and anion exchange resin allow a relatively slow migration of ions through the resins. Hence, a stable voltage over an extended period of time is established. Movement of the ions can be changed with a polarity reversing voltage which sends ions back to the electrolyte reservoir. The effect is to enable a rechargeable battery.

In another embodiment, the ion permeable membrane allows rapid migration of ions through the resins. Hence, a voltage spike over a short period of time is established. Movement of the ions can be changed with a polarity reversing voltage which sends ions back to the electrolyte reservoir. The effect is to enable a rechargeable supercapacitor.

Examples of electrolyte are mixtures of tetraethyl ammonium (positive ion) and tetrafluoro borate (negative ion), and the like.

The cation exchange resin and anion exchange resin are membranes that are typical ion exchange membranes. Ion exchange membranes have functionality specific to pass ions of a particular charge.

An anion exchange resin can serve to transport anions and is typically a material such as Neosepta AHA. Neosepta AHA contains a quaternary ammonium functionality that can allow transport of anions such as tetrafluoroborate ion, hexafluorophosphate ion, trifluoromethylsulfonate ion, or the like. Such resins are typically of 0.22 mils thickness when used as separators in electrolytic cells.

A cation exchange resin can serve to transport cations and is typically a material such as Nafion 117. Nafion 117 contains a sulfonate functionality that can allow transport of cations such as protons, lithium ion, tetraethylammonium ion, or the like. Such resins are typically of 0.18 mils thickness when used as separators in electrolytic cells.

The advantage of the asymmetric membrane design is that transport is largely limited to electrolyte ions while the ionic forms of the pyrazine-based cyanoazacarbon generally remain within their respective anode and cathode compartments. This decreases the parasitic losses that are typical of most battery designs.

The scope of the invention is defined by the claims, which are incorporated into this section by reference. A more complete understanding of embodiments on the present disclosure will be afforded to those skilled in the art, as well as the realization of additional advantages thereof, by consideration of the following detailed description of one or more embodiments. Reference will be made to the appended sheets of drawings that will first be described briefly.

The following detailed description of the invention is merely exemplary in nature and is not intended to limit the invention or the application and uses of the invention. Furthermore, there is no intention to be bound by any theory presented in the preceding background of the invention or the following detailed description of the invention.

DETAILED DESCRIPTION OF THE INVENTION

In the past two decades there have been extensive developments in the use of organic materials in applications that were formerly restricted to inorganic substances. Some of the potential advantages of using organic materials instead of inorganic materials for electrical storage devices are low cost, ease of processing, flexibility for design and fabrication, controllable morphology, and the ability for systematic modification.

Low Cost: Organic materials, unless they are very difficult to synthesize, or contain a lot of halogen or other heavier heteroatoms, are typically cheaper than inorganic materials based metals or silicon.

Ease of Processing: Organic materials are typically more volatile, and/or more soluble in solvents than inorganic materials such as oxides, or high purity silicon. They can thus be processed into thin films by vaporization, spin coating, or other spray type methods. They can also be soaked into high surface area substrates such as conducting foams, and can be incorporated into polymers either as copolymer in-chain components or as additives. These methods are adaptable to large areas.

Flexibility For Design and Fabrication: Most inorganic materials are glass-like and brittle. They may have high modulus but typically are rigid with very limited elongation to break. Thus they are often difficult to form into shapes that might server dual purposes, e.g. structural and energy storage.

Controllable Morphology: Inorganic materials are typically crystalline, an advantage in some applications, but at least in principal, organic materials can be either crystalline or amorphous and by manipulation of non-functional side groups, can lead to controlled morphology in the solid state. The development of this art, for purposes of controlling transport parameters such as mobility, is however still in its infancy.

Ability For Systematic Modification: Both organic and inorganic materials can be modified by addition of blended, dissolved, or alloyed combinations. However the variation possible in organic systems is broader, and in some respects is better developed due to the known effects of functional group variation in organic synthesis and reactions. Band gaps, electron affinity, electrochemical redox properties, and conductivity are just a few of the examples of properties that can be manipulated by organic substituent effects.

The discovery of conducting organic solids has led to uses in applications as disparate as organic light emitting diodes (OLEDs), organic field effect transistors (OFETs) and organic photovoltaic cells (OPV). However the field of batteries remains largely based on inorganic materials with the leading choices being lithium/transition metal oxides and nickel metal hydrides. Although organic polymer batteries have been described and constructed, they suffered from several limitations. Most serious among the limitations was the dearth of stable negatively charged (n-doped) materials. While on the oxidative side (p-doped) there are a number of choices, including polyaniline, polythiophenes, and polypyrrole, these materials are typically oxidized at low potential and cells based on them have low voltages. On the reductive side only polyacetylene has been extensively investigated, and it accepts negative charge only at very negative potentials. This would be good from a cell voltage perspective, but leads to decomposition and instability. Hybrid systems using organic and inorganic combinations of materials have been suggested but they are hampered by stability problems and fabrication complexity, and they have not thus far led to lower costs or higher energy densities. Described herein is the discovery of new materials with fundamental redox properties that allow construction of wholly organic electrical storage devices, including redox flow batteries, shapeable cells, and redox active capacitors, or supercapacitors. Both molecular and polymeric versions of these materials have been developed, including polymers that can be spin cast into thin films and which add structural flexibility to the design of devices.

Molecular species based on cyanopyrazines show highly reversible reduction waves by cyclic voltammetry at moderately negative potentials. This observation is salient, because of the innate instability that plagues most n-doped or n-carrier materials. The examples are particularly stabilized by resonance rather than by direct induction that would be observed by introducing many perfluorinated groups. As a result, the approach offers the advantages of heteroaromatic stability, ease of synthesis, and low cost.

A second salient discovery was reversible oxidation of certain of the cyanopyrazines. This novel result was not expected, and arises in certain cases from the unusual juxtaposition of electron poor rings, and relatively electron rich rings within the same molecule. Simple molecular orbital calculations show that the highest occupied molecular orbital (HOMO) in this system lies primarily on the central ring, and thus the oxidation of dibutyl-TCAA occurs largely from this ring. This interpretation runs parallel to the observation of ready oxidation that occurs at carbons 9,10 in anthracene due to the more complete aromatization that can occur at the outer rings, but in addition in this case, the para nitrogen atoms of the central ring share the "discomfort" caused by the non-octet electron configuration.

On the other hand, the lowest unoccupied molecular orbital (LUMO) of dibutyl-TCAA has electron density primarily on the outer two rings, which are also typically more benzenoid in character as in anthracenes (i.e. more fully aromatic. The two outer rings are more fully aromatic compared to the middle ring which is more saturated. This important difference accounts for the unusual redox behavior.). The observation of both oxidation and reduction leads to another very attractive feature of batteries based on these materials. In most conventional primary or rechargeable (secondary) cells the anode and cathode are made from different materials. This means that fabrication methodology must developed for each side independently and often the two materials have very different properties. For example a typical "lithium" battery consists of lithium metal intercalated into graphite for one electrode, and a transition redox active metal oxide or phosphate that can accept lithium cations for the other electrode. We have developed a battery in which the same material constitutes both substrates for redox change. This not only greatly reduces the complexity of fabrication but if problems arise regarding porosity and electrode contact, they only need to be solved for one set of materials, not two. Most importantly, the "crossover" problem is greatly mitigated and the membrane separator only needs to prevent mechanical mixing, since both sides of the cell use the same material. Finally, we can use many salts, including organic ionic liquids, as the ionic charge carriers in our cell.

We have synthesized a number cyanopyrazene molecular species. While some of these preparations were in the literature, a number of improvements especially relating to scale-up, have been made. Therefore we now have, methods to make substantial quantities of materials. We focus particularly in the di-hydro-TCAA species which is the key intermediate in the syntheses described below. This molecule, which is a cyanoazacarbon, containing only carbon and nitrogen, except for the 9,10 hydrogen, is moderately acidic due to the numerous electron withdrawing groups, as evidenced by the proton chemical shift at 12.6 δ. Typical reactions use triethylamine as a proton scavenger and the anion reacts readily with electrophiles such as methyl iodide and bromobutane. Indeed, the addition of the first electron releasing alkyl group generally makes the second addition more facile, and it is difficult to stop the reaction at the mono adduct stage. Advancing these observations to prepare polymers is straightforward and several particularly promising approaches have been investigated.

The addition of a difunctional electrophile such as 1.4-dibromobutane, in the presence of triethylamine affords the corresponding poly(butanyl)-9,10-TCAA polymer. This material is soluble in polar organic solvent such as N-methylpyrrolidinone, and can be spin cast. This polymer mimics the redox properties of the molecular species and this has been confirmed by solid state voltammetry of thin films on Indium Tin Oxide (ITO) glass (which is an electrical conductor on its treated surface).

A second approach to polymers makes use of the reaction of formaldehyde and hydrochloric acid to form the bischloromethyl adduct. The bischloromethyl TCAA has the functional groups used as the standard precursors to vinylene polymers by step-growth dehydrohalogenation. Since the TCAA ring itself is quite strongly fluorescent, we expect this polymer to be a potentially interesting material for testing in OLEDs in addition to having the redox properties associated with the molecular constituents.

A third class of polymers derives from addition of a vinyl group. This can be readily accomplished by reaction with vinyl acetate. Because vinyl acetate is slightly less electron releasing than saturated alkyl groups, we can control monosubstitution. The mono alkyl TCAA will then have a point of attachment to other substrates or can be functionalized further. The vinylic polymers in which the TCAA moiety is the pendent group are a new class of redox active polymer. Vinylic monomers typically offer great flexibility by allowing the preparation of copolymers, which in turn, allow properties to be readily modified. A salient example is controlled polymerization to afford more porous structures.

Another pathway to polymerization is bulk electrochemical polymerization. This can be accomplished by attaching polymerizable groups to the 9 and 10 positions. This would be done via a Buchwald Hartwig coupling or similar coupling reactions. The advantage of this method of polymerization would be ability to coat large surfaces evenly.

The concentration of active species in a Redox Flow Battery (RFB) is ideally as high as possible but is limited by the solubility of the active species. In our embodiment using dibutylTCAA the concentration range is from 0.02 Molar to 0.2 molar (the saturated solution in the presence of supporting electrolyte). This level is as high or higher than competing inorganic metal complexes.

The pyrazine based cyanoazacarbon species have are defined by their unusually high nitrogen content and low hydrogen content compared to most organic species. For example dihydrotetracyanohexaazaanthracene has the structural formula $C_{12}N_{10}H_2$ where the two hydrogen atoms are acidic and replaceable. This class of compounds has highly unusual electron accepting properties because of the cyano substitution, but in our special instance, also allows oxidation at the more saturated (hydrogenated) ring.

In summary the novel polymers we have described are prepared, and based on the known properties of the related small molecules but offer properties for useful materials. In particular, the idea of having identical materials on both sides of an electrochemical cell offers simplicity and ease of fabrication not found in conventional batteries, whether they are organic or inorganic. (A possible exception to this statement is the best known inorganic battery of all, the Pb—$PbO_2$ cell. While not identical the two electrodes are derived from the same metal and share a common ion for transport, $Pb^{2+}$.) Finally, the prospect of an organic battery, fabricated using identical thin films on both electrodes, gains the possibility of creating battery shapes not feasible for carbon and transition metal oxides, and allows the placement of thin film batteries into designs that have multiple functions, such as armor, insulation, or other locations that which need stored energy.

Figure 1:
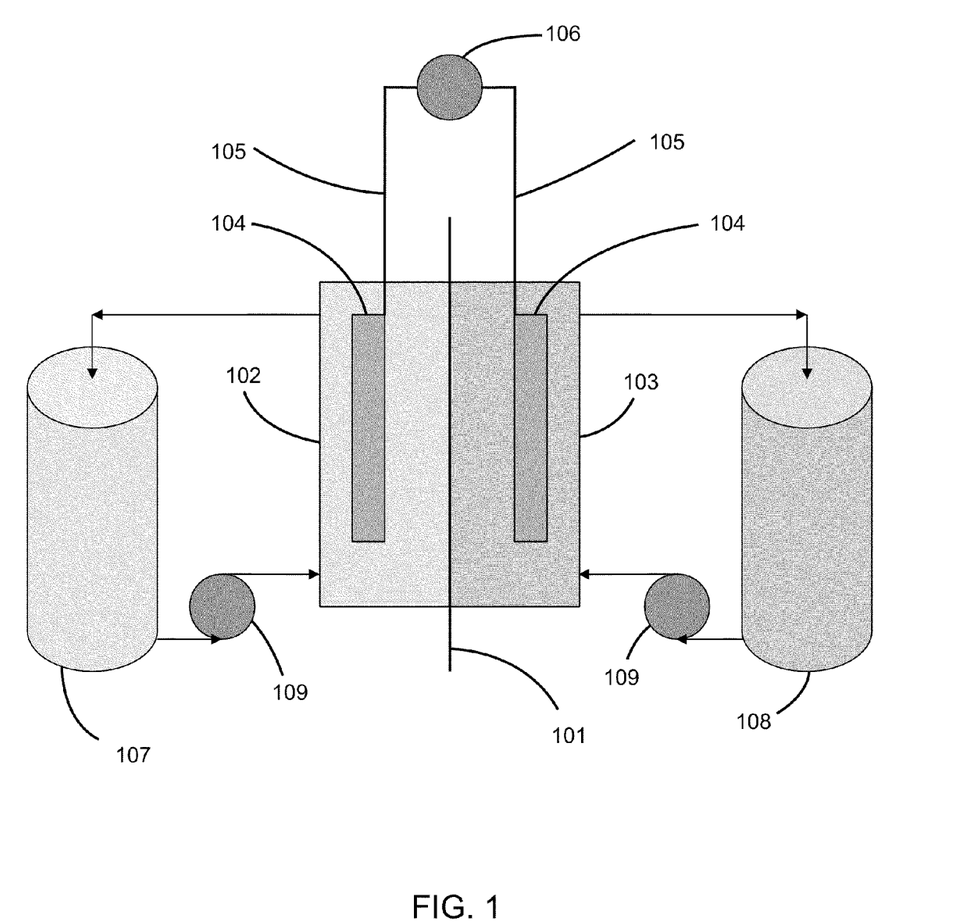
FIG. 1 shows an electrolytic cell using an ion transport membrane such as Celgard polypropylene 3500.

FIG. 1 shows an electrolytic cell using an ion transport membrane. An ion transport membrane 101 separates a catholyte reservoir 102 and anolyte reservoir 103. Inert electrodes 104 transfer charge via a conductor 105 through a load 106. In an optional embodiment, a catholyte tank 107 and anolyte tank 108 effectively increase reservoir capacity with the use of pumps 109.

Figure 2:
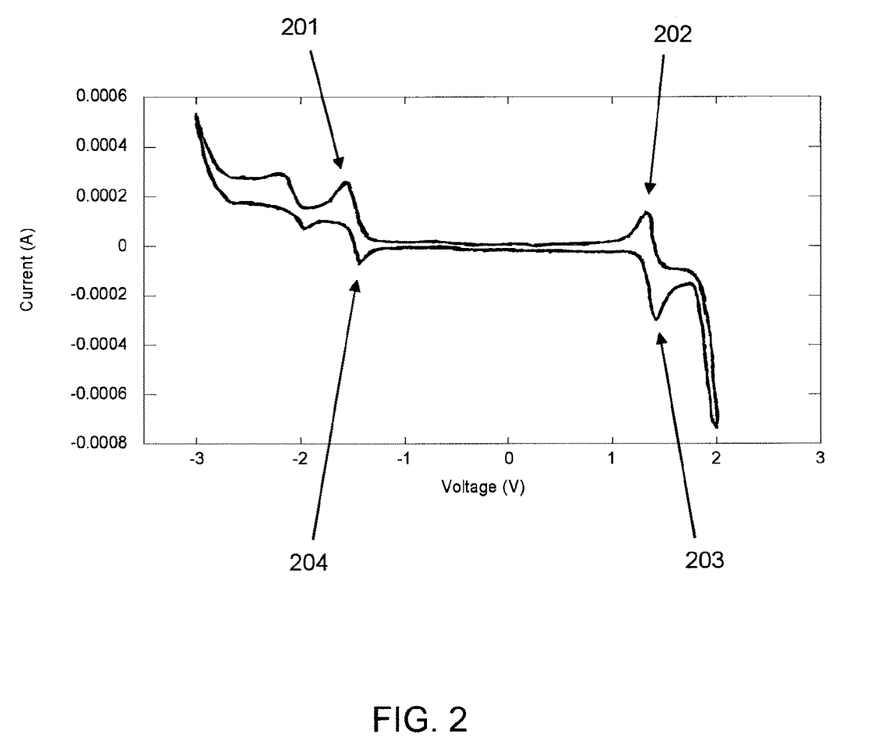
FIG. 2 shows a current vs. voltage plot for the molecule 9-10-butyl-2,3,6,7-tetracyano-1,4,5,8,9,10-hexazaanthracene.

FIG. 2 shows a current vs. voltage plot for the molecule 9-10-butyl-2,3,6,7-tetracyano-1,4,5,8,9,10-hexazaanthracene. The cyclic voltammogram shows the molecule being reduced 204, reoxidized 201, oxidized 202, and re-reduced 203. Thus molecule dibutyl-TCAA shows beautifully reversible electrochemistry under both oxidation and reduction, with the oxidation and reduction waves separated by nearly three volts, a remarkable result. A battery based on these two reactions would similarly yield an open circuit potential of ~3 volts per cell. Furthermore, there is evidence that overcharging at either electrode would not immediately lead to decomposition since additional quasi-reversible waves are observed outside the window of the reversible waves.

Figure 3:
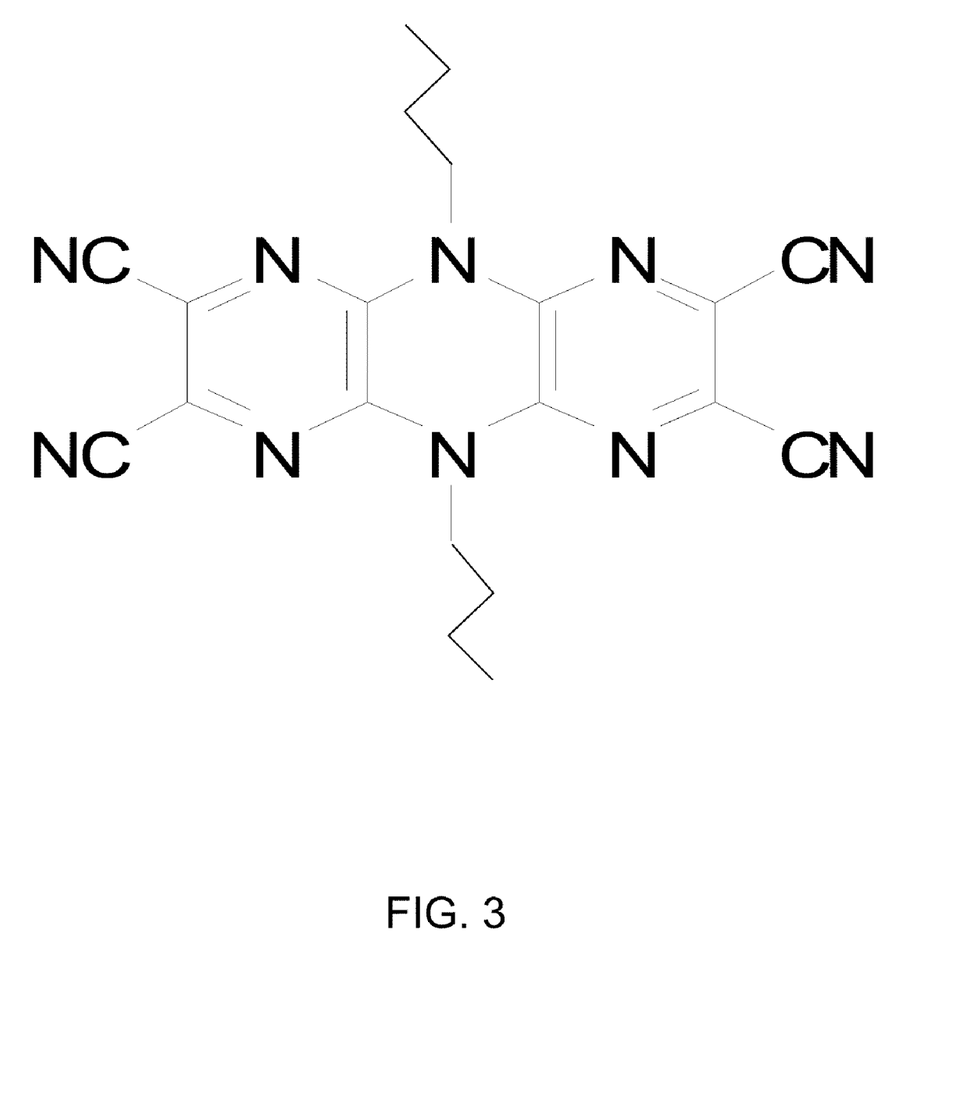
FIG. 3 is a depiction of the molecule 9-10-butyl-2,3,6,7-tetracyano-1,4,5,8,9,10-hexazaanthracene.

FIG. 3 shows the molecule 9-10-butyl-2,3,6,7-tetracyano-1,4,5,8,9,10-hexazaanthracene.

Figure 4:
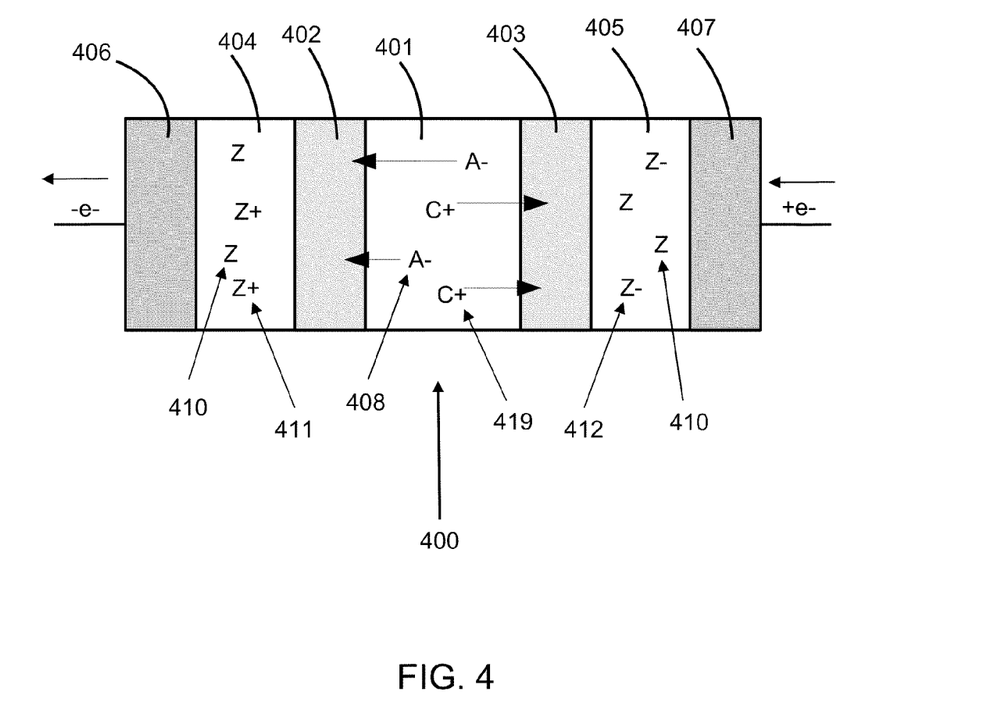
FIG. 4 shows an electrolytic cell using an asymmetric membrane separator system.

FIG. 4 shows an electrolytic cell using an ion permeable membrane separator system. The elements of the electrolytic cell using an ion permeable membrane separator system 400 shown are an electrolyte reservoir 401, anion exchange resin 402, cation exchange resin 403, anode compartment 404, cathode compartment 405, anode 406, cathode 407, negative electrolyte ion 408 (shown as A−), positive electrolyte ion 409 (shown as C+), active species 410 such as 9,10-butyl-2,3,6,7-tetracyano-1,4,5,8,9,10-hexaazaanthracene (shown as Z), reduced active species 411 (shown as Z−), and oxidized active species 412 (shown as Z+). When discharging, negative electrolyte ion 408 migrates into anion exchange resin 402 while positive electrolyte ion 409 migrates into cation exchange resin 403. To maintain charge balance, the active species 410 is oxidized in the anode compartment 404 to oxidized active species 411. Concurrently, the active species 410 is reduced in the cathode compartment 405 to reduced active species 412. Electron flow is shown by arrows on the left and right sides on FIG. 4. When charging, ionic flow is the reverse of when discharging.

Figure 5:
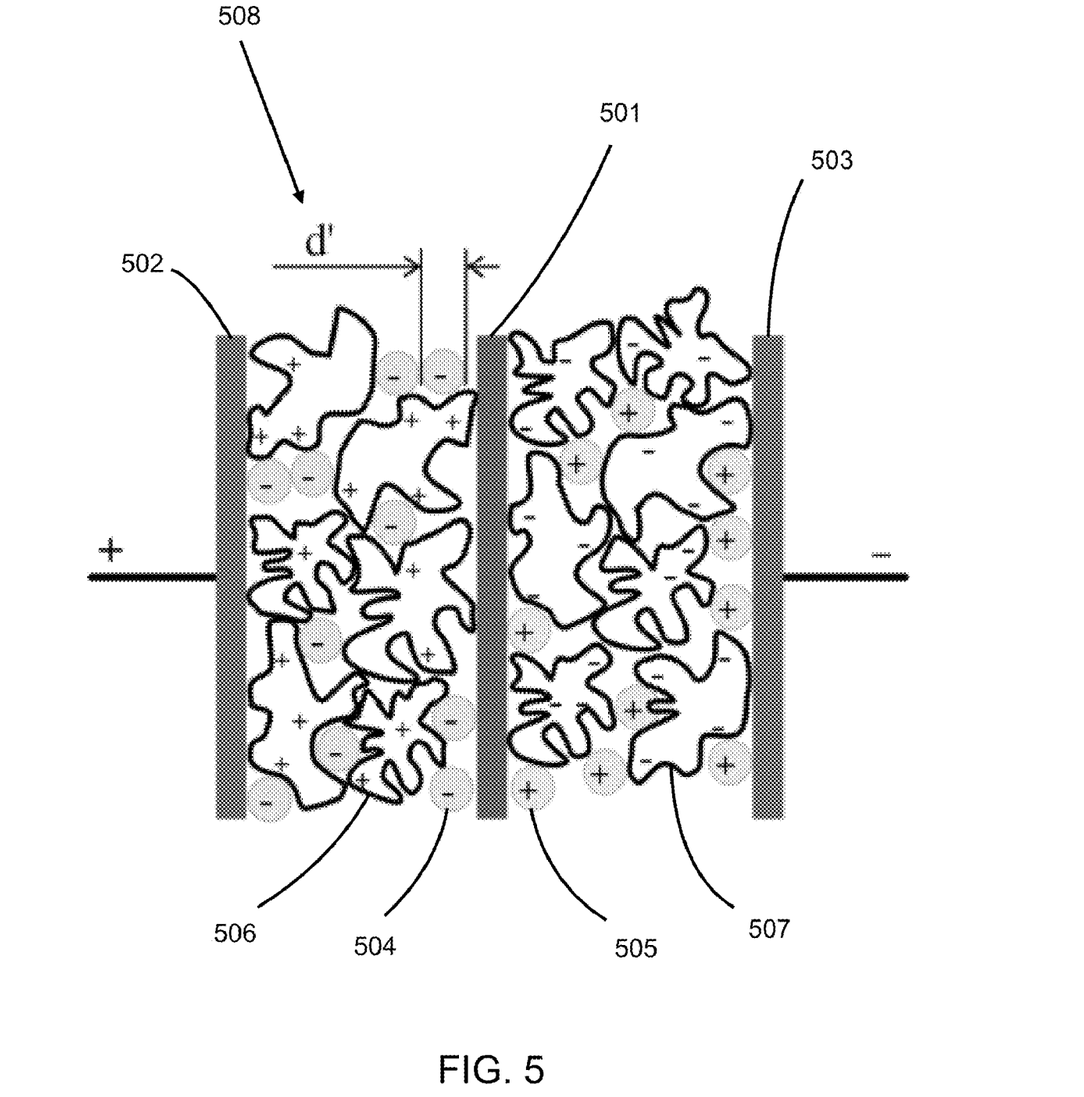
FIG. 5 shows a supercapacitor.

FIG. 5 shows a supercapacitor. The ion permeable membrane is shown as 501, the current collectors 502 and 503, the supporting electrolyte ions are shown as 504 and 505, and the redox active polymer is shown as 506 and 507 in their charged states, and the distance of the normal ionic double layer is shown at 508. The drawing shows a high surface area redox active material as a high capacitance nano-structured supercapacitor. Active material thickness is typically from 100-300 microns so as to provide rapid discharge of capacitor charge. Such electrodes are typically formulated by combining a redox active species (80 parts) with conductive carbon such as Timcal Super P (15 parts) and a binder such as Sigma Aldrich PVDF (5 parts). The active species, carbon, and binder are thoroughly mixed in a Flacktech blender and then mixed with a slurry solvent such N-methylpyrrolidinone and applied to a current collecting surface by doctor blade techniques. The solvent is removed by evaporation.

Figure 6:
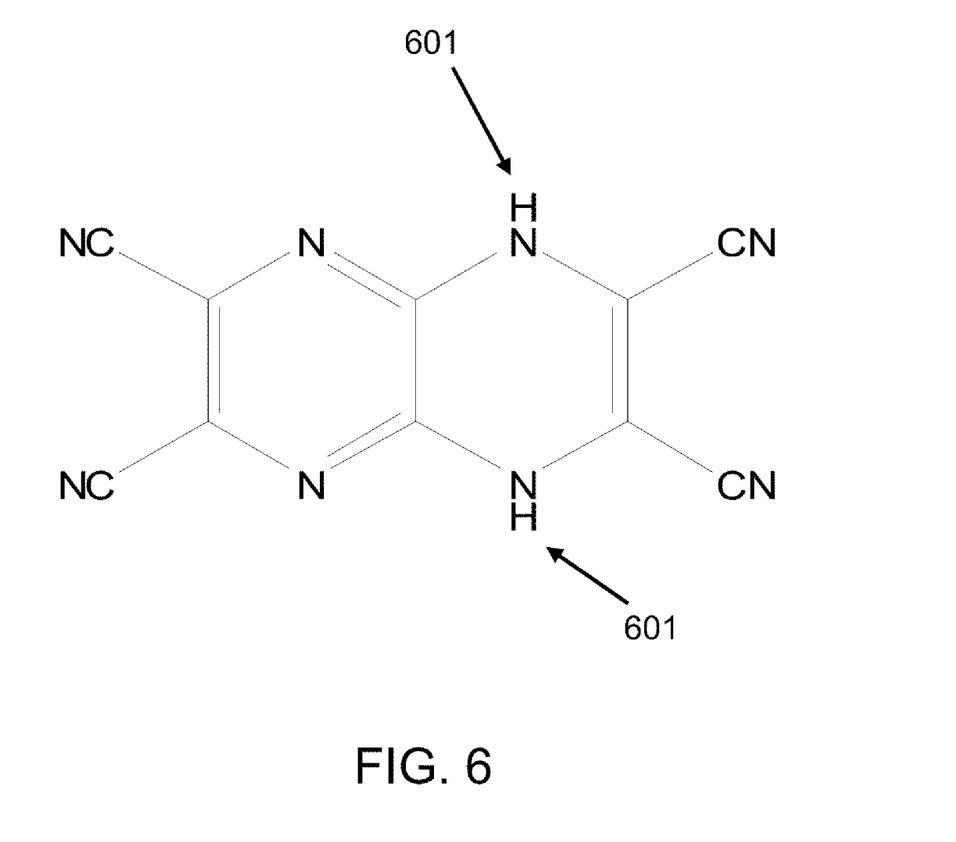
FIG. 6 shows a Pyrazine-Based Cyanoazacarbon Polymer with two rings.

FIG. 6 shows a Pyrazine-Based Cyanoazacarbon Polymer with two rings. Polymer groups can be substituted at locations where the hydrogen atoms 601 are shown. Examples of polymer groups are methyl, ethyl, propyl, butyl, pentyl, hexyl, heptyl, octyl, and the like.

Figure 7:
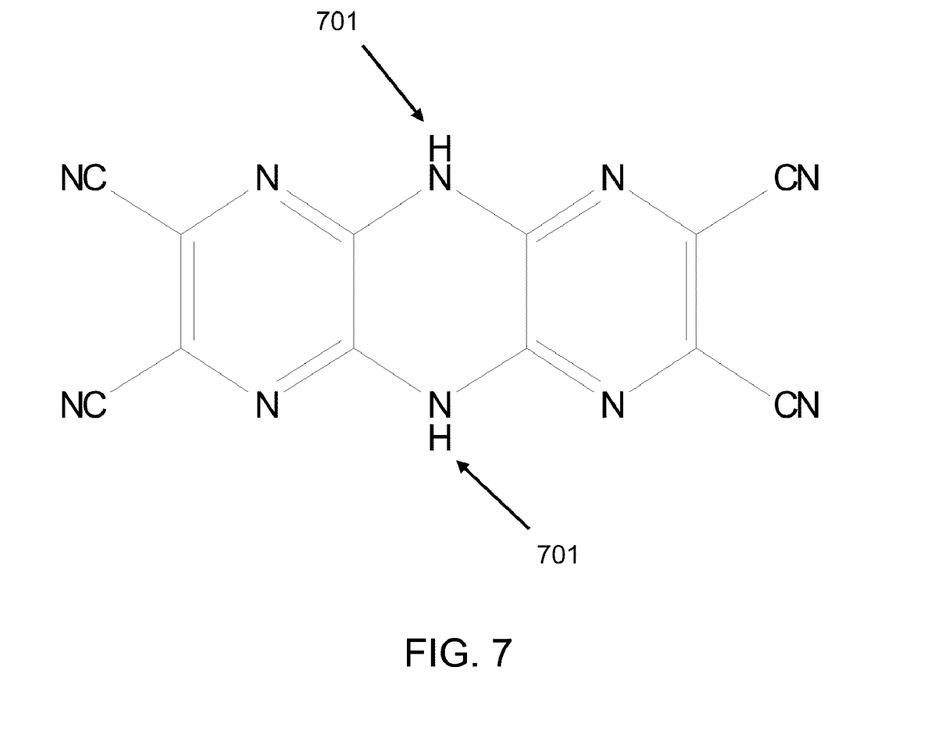
FIG. 7 shows a Symmetrical Pyrazine-Based Cyanoazacarbon Polymer with three rings.

FIG. 7 shows a Symmetrical Pyrazine-Based Cyanoazacarbon Polymer with three rings. Polymer groups can be substituted at locations where the hydrogen atoms 701 are shown. Examples of polymer groups are methyl, ethyl, propyl, butyl, pentyl, hexyl, heptyl, octyl, and the like.

Figure 8:
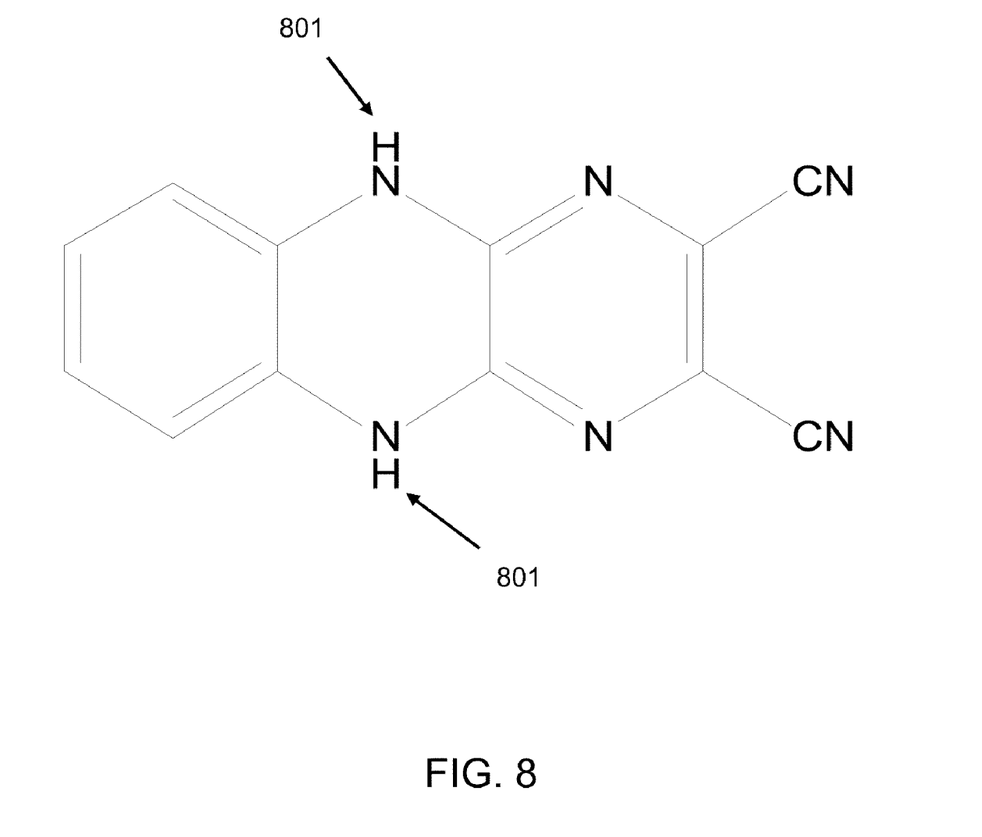
FIG. 8 shows an Asymmetrical Pyrazine-Based Cyanoazacarbon Polymer with three rings.

FIG. 8 shows an Asymmetrical Pyrazine-Based Cyanoazacarbon Polymer with three rings. Polymer groups can be substituted at locations where the hydrogen atoms 801 are shown. Examples of polymer groups are methyl, ethyl, propyl, butyl, pentyl, hexyl, heptyl, octyl, and the like.

Figure 9:
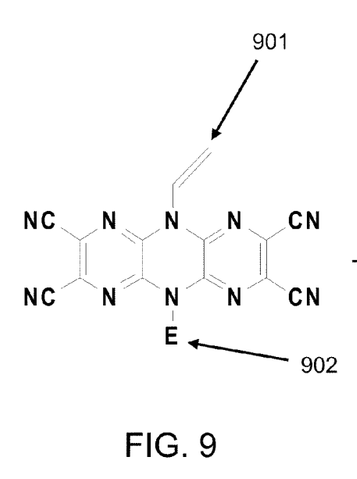
FIG. 9 shows a Vinyl Derivative of a Pyrazine-Based Cyanoazacarbon Polymer with three rings.

FIG. 9 shows a Vinyl Derivative of a Pyrazine-Based Cyanoazacarbon Polymer with three rings. A vinyl functional group 901 and secondary functional group 902 (shown as E) are depicted.

Figure 10:
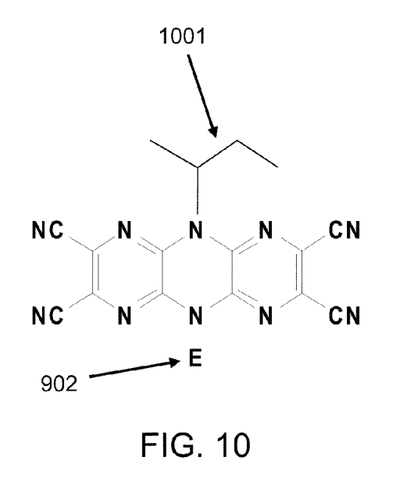
FIG. 10 shows a Pyrazine-Based Cyanoazacarbon Polymer with three rings where the active species is pendant from the polymer chain.

FIG. 10 shows a Pyrazine-Based Cyanoazacarbon Polymer with three rings where the active species is pendant from the polymer chain. FIG. 9 and FIG. 10 show the polymerization mode wherein a vinyl group 901 is polymerized by free radical or ionic induction to afford a polymer product 1001 in which the active species in pendant from the chain. The other mode of polymerization using dibromobutane for example (also shown as E 902 in FIG. 9 and FIG. 10), results in step growth polymerization and the active species is in-chain. A second example of this type of linking reagent is 2,2-dimethyl-1,3-dichloropropane, also known as neopentyl dichloride.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations and broad equivalent arrangements that are included within the spirit and scope of the following claims.

I claim:

1. An electrical storage device utilizing a three-ring symmetrical pyrazine-based cyanoazacarbons or polymers derived from three-ring symmetrical pyrazine-based cyanoazacarbons, the device comprising:
    an ion permeable membrane that allows ionic conductivity;
    a cathode compartment which is functionally attached to the cathode side of the ion permeable membrane and contains a mixture of pyrazine-based cyanoazacarbons, solvent, and positive ions of pyrazine-based cyanoazacarbons;
    an anode compartment which is functionally attached to the anode side of the ion permeable membrane and contains a mixture of pyrazine-based cyanoazacarbons, solvent, and negative ions of pyrazine-based cyanoazacarbons;
    a cathode which is electrically connected to the cathode compartment; and
    an anode which is electrically connected to the anode compartment;
    both compartments contain a supporting electrolyte such as tetraethylammonium tetrafluoroborate.

2. The device of claim 1, wherein the ion permeable membrane comprises:
    an electrolyte reservoir containing an electrolyte liquid consisting of positive ions and negative ions;
    a cation exchange resin which is functionally attached to the electrolyte reservoir and absorbs the positive ions; and
    an anion exchange resin which is functionally attached to the electrolyte reservoir and absorbs the negative ions.

3. The device of claim 2, wherein the cation exchange resin and the anion exchange resin transportions at a rate fast enough to charge and discharge the device between 10-20 seconds.

4. The device of claim 3, wherein the pyrazine-based cyanoazacarbons consist of 9-10-butyl-2,3,6,7-tetracyano-1,4,5,8,9,10-hexazaanthracene.

5. The device of claim 4, wherein the solvent consists of acetonitrile or a mixture of propylene carbonate and ethylene carbonate.

6. The device of claim 5, wherein the positive ions of the electrolyte liquid contained in the electrolyte reservoir are positive ionic form of tetraethyl ammonium and the negative ions of the electrolyte liquid contained in the electrolyte reservoir are negative ionic form of tetrafluoro borate.

7. The device of claim 2, wherein the cation exchange resin and the anion exchange resin transportions at a rate slow enough to charge and discharge the device between 1-100 hours.

8. The device of claim 7, wherein the pyrazine-based cyanoazacarbons consist of 9-10-butyl-2,3,6,7-tetracyano-1,4,5,8,9,10-hexazaanthracene.

9. The device of claim 8, wherein the solvent consists of acetonitrile or a mixture of propylene carbonate and ethylene carbonate.

10. The device of claim 9, wherein the positive ions of the electrolyte liquid contained in the electrolyte reservoir are the positive ionic form of tetraethyl ammonium and the negative ions of the electrolyte liquid contained in the electrolyte reservoir are the negative ionic form of tetrafluoro borate.

\* \* \* \* \*